United States Patent Office 3,541,174
Patented Nov. 17, 1970

3,541,174
CATALYST IN USE FOR TRANSALKYLATION OF ALKYL - BENZENES (DEALKALIZED ZEOLITE TUFF) AND PROCESS UTILIZING THE SAME
Takehisa Inoue, Tadashi Miyata, Takeshi Sonoda, Takeshi Hashiguchi, and Masaki Sato, Kamakura-shi, Kanagawa-ken, Japan, assignors to Toyo Rayon Kabushiki Kaisha, Tokyo, Japan, a corporation of Japan
No Drawing. Filed Dec. 3, 1968, Ser. No. 780,877
Claims priority, application Japan, Apr. 15, 1968,
43/24,737
Int. Cl. C01b 33/28; C07c 3/50, 3/58
U.S. Cl. 260—672    11 Claims

ABSTRACT OF THE DISCLOSURE

A catalyst useful for the transalkylation of alkyl-benzenes, which catalyst consists of a dealkalized zeolite tuff wherein the metaxylene adsorption amount is at least 1.0 weight percent and the ratio of the benzene adsorption amount to the metaxylene adsorption amount is in the range of from 0.9 to 1.5. The catalyst is obtained by subjecting a zeolite tuff having a zeolite content of at least 40 weight percent to a dealkalization treatment until more than 50 mol percent of the total alkali metal content is dealkalized, the tuff being thereafter washed, dried and calcined.

---

This invention relates to a transalkylation catalyst, and more specifically to a catalyst consisting of a zeolite tuff for use in the transalkylation of alklylbenzenes and a process for transalkylation of alkylbenzenes using said catalyst.

Recently, synthetic zeolites represented by molecular sieves manufactured by the Linde process have been used broadly as molecular sieves and drying agents. They have been used broadly also as catalysts for conversion of hydrocarbons, e.g. as a cracking catalyst.

As is well known, synthetic zeolites consist substantially of a pure zeolite and exhibit excellent sieving effects. Dealkalized zeolites prepared by substituting alkali metals contained in such synthetic zeolite by hydrogen or other metallic ions exhibit high catalytic activities in chemical reactions. It is presumed that these effects and activities of zeolites result from their uniform crystalline structure and numerous fine pores.

It has been recently discovered that tuffs containing great amounts of zeolites of such utility, i.e., natural zeolites produced in so called green tuff belts, are available and has been conducted to utilize these zeolite tuffs as molecular sieves, catalysts, adsorbents, etc.

Although synthetic zeolites are very useful, as mentioned above, they have the following disadvantages. Since they take a powdery form, it is difficult to mold them into pellets, the form in which they are actually used. Further, even if they can be molded into pellets, they are apt to crumble away. When they are molded by employing a binder, their activity is lowered and their properties are greatly influenced by the time on stream. In addition, their manufacturing cost is very high. Accordingly, if use of such natural zeolites as molecular sieves, catalysts, adsorbents, etc. is successfully developed, great economical advantages will arise.

However, natural zeolites are now utilized only in the restricted fields, for instances as soil-improving agents or water softeners where their ion-exchanging ability is utilized, as small ion-removing agents where their adsorbing ability is utilized or as fillers for the paper manufacture where their excellent whiteness is utilized, but use of natural zeolites as effective catalysts for chemical reactions has not been developed up to the present. The reason is assumed to be that since zeolite tuffs contain impurities such as quartz, α-cristobalite, feldspar, montomorillonite and illite and these gelled impurities cover the fine zeolite structure tightly, manifestation of sieving or catalytic activities is prevented by such tight coverage of impurities. Actually, the powder of a zeolite tuff itself exhibits only a very low adsorbing ability for various gases, and hardly has any sieving or catalytic activities. Thus, based on the assumption that useful molecular sieves or catalysts would be obtained by removing impurities from a zeolite tuff by a suitable chemical treatment, various researches have been made to utilize a zeolite tuff as a molecular sieve or catalyst by removing gelled impurities therefrom by an alkali or acid treatment. However, such conventional art has not succeeded in using a zeolite tuff efficiently as an adsorbent, and further, no proposal of using a zeolite tuff as a catalyst has been made.

As a result of various experiments we have found that when a zeolite tuff is treated with an acid of a high concentration, the zeolite crystalline structure is easily allowed to crumble away, and that a zeolite tuff treated with an acid of a low concentration is inferior in adsorbing selectivity and cannot be adsorbent having a suitable sieving ability. Further, it has been also confirmed that when a zeolite tuff treated with an acid of a low concentration is used as a catalyst in various reactions, its properties are greatly degraded by the time on stream and thus, such zeolite tuff cannot be successfully used as a catalyst.

We have made various researches to develop uses, particularly as a catalyst, of such zeolite tuffs. We have turned our attention to the fact that there has not yet been developed a catalyst having high and durable catalytic activity for use in the transalkylation of alkylbenzenes of low utility, such as toluene, to alkylbenzenes of higher utility, such as benzene and xylene, though recently benzene and xylene have been greatly used for preparation of synthetic fibers or resins. Thus, we have arrived at the recognition that such useful alkylbenzenes would be advantageously produced if a zeolite tuff could be used efficiently for such transalkylation.

Accordingly, an object of this invention is to provide a transalkylation catalyst consisting of a zeolite tuff the same being excellent in catalytic activity and durability.

Another object of this invention is to provide an advantageous process for the preparation of alkylbenzenes of high utility by transalkylation of alkylbenzenes of comparatively low utility.

Still another object of this invention is to provide an advantageous process for the preparation of benzene and xylene by disproportionation of toluene.

Still another object of this invention is to provide an advantageous process for the preparation of orthoxylene and paraxylene by isomerization of metaxylene.

As a result of our researches it has been found that when a dealkalized zeolite tuff is used as a catalyst for the transalkylation of alkylbenzenes its catalytic activity differs depending on the amount of a molecule having a size adsorbed larger than a certain specific size, and the ratio of adsorption of two molecules having different sizes, and that a dealkalized zeolite can be a catalyst for the transalkylation of alkylbenzenes having high catalytic activity and excellent in its durability, when said adsorption amount and ratio are within specific ranges.

Accordingly, the objects of this invention can be attained by a catalyst for transalkylation of alkylbenzenes which consists of a dealkalized zeolite tuff wherein the metaxylene adsorption amount is at least 1.0 weight percent and the ratio of the benzene adsorption amount to the meta-xylene adsorption amount is in the range of from 0.9 to 1.5.

By the term of "transalkylation of alkylbenzenes" used in this invention are meant disproportionation and isomerization of alkylbenzenes, particularly alkylbenzenes having a limiting molecular diameter (which will be explained hereinbelow) of from 5.6 to 9 A. In these reactions a dealkalized zeolite tuff having the above specified adsorbing properties can exhibit far greater catalytic activity than can conventional catalysts, use of which has been tried in these reactions, such as synthetic zeolites or other silica-alumina catalysts. Additionally such excellent catalytic activity can be maintained for a long period of time. As an instance of disproportionation of alkylbenzenes there can be cited the conversion of a monoalkylbenzene to benzene and dialkylbenzenes. More specifically, there can be cited the conversion of toluene to benzene and xylenes. As an instance of isomerization of alkylbenzenes, there can be cited the conversion of metaxylene to orthoxylene and paraxylene. The catalyst of this invention tends to positively prohibit occurrence of conversion resulting from cleavage of the benzene ring.

The zeolite tuffs to be used in the preparation of the catalyst of this invention are those which are produced in large amounts from so called green tuff belts found in various locales and which generally comprises a zeolite forming a fine crystalline structure which is helmeted with mineral impurities such as quartz, α-cristobaltie, feldspar, montmorillonite and illite. The zeolite content of such zeolite tuff is in the range of from 5 to 70 weight percent. As the starting material for the efficient preparation of the catalyst of this invention are zeolite tuffs whose zeolite contents are greater than 40 weight percent. Accordingly, the zeolite tuff used herein means one whose zeolite content is greater than 40 weight percent. It is very difficult to determine the chemical composition of the zeolite contained in such zeolite tuff or its type corresponding to synthetic zeolite. Actually, both the chemical composition and type of the zeolite contained in such zeolite tuff are not clarified, but they can be indirectly understood from the adsorbing properties of the dealkalized zeolite tuff, which will be specified and explained hereinbelow.

The catalyst of this invention is prepared by substituting alkali components contained in the above described zeolite tuff with hydrogen by a dealkalization treatment, whereby more than 50 mol percent, preferably more than 90 mol percent, measured by the absorptiometric analysis method, of the total alkali metals contained in the zeolite tuff are substituted with hydrogen. The dealkalization treatment is conducted by treating a zeolite tuff with a dilute aqueous solution (usually 0.1–3 N) of an inorganic or organic acid such as nitric acid, hydrochloric acid and acetic acid to directly substitute alkali components with hydrogen. The treating temperature is generally in the range of from room temperature to 100° C. The treating time varies depending on the concentration of the treating aqueous solution and the treating temperature, but it is usually in the range of from 6 hours to 4 days. The other dealkalization method comprises treating a zeolite tuff with an aqueous solution (usually having a concentration of 1 to 40 weight percent, preferably 5 to 15 weight percent) of an ammonium compound such as ammonium chloride and ammonium nitrate to substitute alkali components with $NH_4^+$, and then subjecting the ammoniated zeolite tuff to a heat treatment at 400 to 650° C. to deammoniate it and form a hydrogen-substituted product. Since this method includes the deammoniation treatment, it seems to require complex operation procedures, but this is not the case. Actually, this method can attain the dealkalization most efficiently. The reason is that since the catalyst of this invention as well as other solid acid catalysts is subjected to a heat treatment and then used for the reaction, the deammoniation is inevitably performed during this heat treatment. Such heat treatment is usually conducted after the molding of the catalyst but before its application to the reaction, but it is optionally performed by utilizing the heat for transalkylation.

It is preferred that the zeolite tuff is subjected to the dealkalization treatment in a form of coarse particles having a diameter of 0.2 to 5 cm., particularly 0.5 to 3 cm. When the particle size of the zeolite tuff is smaller than 0.2 cm., though its catalytic activity is improved, the separation and recovery thereof are very difficult. In case the particle size of the zeolite tuff is greater than 5 cm., a uniform catalytic activity cannot be expected and it is difficult to obtain a catalyst having the specific properties intended in this invention.

The zeolite tuff dealkylized by either of the above described methods is sufficiently washed with water, dried at 120 to 150° C., and optionally ground into powder capable of passing through a 12 mesh sieve. Then, it is molded into pellets by using a customary molding machine, for instance, a tablet machine. It is preferred that the pellet has a diameter of 2 to 8 mm. as in the case of ordinary solid acid catalysts. The catalyst of this invention which consists of a dealkalized zeolite tuff is more easily moldable than synthetic zeolite powder which consists of pure zeolite. Further, the pelletized product of the dealkalized zeolite tuff does not tend to crumble away.

The dealkalized zeolite tuff which has been dried and optionally pelletized is then subjected to a calcination treatment as in the case of other solid acid catalysts. The calcination is carried out at a temperature of 400 to 650° C., preferably 500 to 800° C. for at least one hour, preferably at least 3 hours. The calcination may be performed by utilizing the reaction heat for transalkylation.

According to this invention, in order that the dealkalized and calcined zeolite tuff may be an effective catalyst for transalkylation of alkylbenzenes, it should have a metaxylene adsorption amount of at least 1.0 weight percen, preferably 1.2 weight percent and a ratio of the benzene adsorption amount to the metaxylene adsorption amount of from 0.9 to 1.5, preferably from 1.0 to 1.3. Thus, the metaxylene and benzene adsorption amounts of the dealkalized and calcined zeolite tuff are measured. The metaxylene or benzene adsorption amount referred to in the specification and claims is the equilibrium adsorption weight of benzene or metaxylene adsorbed in 100 g. of the dried catalyst, which is calculated by the following formula:

$$\text{Adsorption amount of benzene (or metaxylene)} = \frac{\text{Equilibrium absorption amount of benzene (or metaxylene)}}{\text{Catalyst (100 g.)}}$$

The equilibrium adsorption amount of the material adsorbed is measured in accordance with the customary weight method (for instance, the method according to JIS K–1412). This is a standard method comprising mixing an adsorbate such as benzene and metaxylene under a prescribed partial pressure with dry $N_2$, allowing it to flow on the catalyst, and thereby calculating the amount adsorbed from the weight increase of the catalyst. It is presumed that condensation as well as adsorption may occur in the material to be adsorbed at the time of the measuring, but the error may be allowed as far as the deviation in the reproducibility of the adsorption weight is within about 10%.

One indispensable requirement of the catalyst of this invention is that the metaxylene adsorption amount is at least 1.0 weight percent. Theoretically, since the transalkylation of alkylbenzenes is presumed to occur in fine pores of the catalyst, it is indispensable that the catalyst should have an apparent pore size sufficient for metaxylene to be easily adsorbed and desorbed.

The above requirement is explained by referring to disproportionation of toluene. The disproportionation of toluene is represented by the following formula:

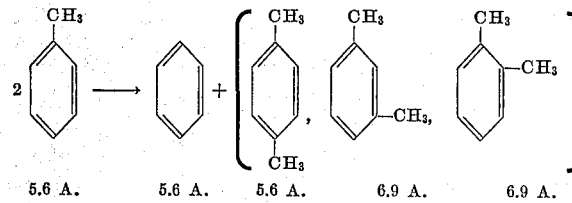

5.6 A.　　5.6 A.　　5.6 A.　　6.9 A.　　6.9 A.

Values shown under the formula are limiting diameters of the molecules. From the above formula it is seen that a catalyst effective for this reaction should have an apparent pore size sufficient for metaxylene to be easily adsorbed and desorbed. From this view point we conjectured that a greater metaxylene adsorption amount would result in a higher activity for the catalyst. As a result of various experiments, we have found that in order to attain the objects of this invention the catalyst should necessarily have a metaxylene adsorption amount of at least 1.0 weight percent, preferably at least 1.2 weight percent. Though the upper limit of the metaxylene adsorption amounts is not particularly specified, it is ordinary that the upper limit of the metaxylene adsorption amount is about 4.0 weight percent. The term "apparent pore size" used herein is a value conjectured from the limiting molecular diameter of the material to be adsorbed. The limiting molecular diameter is a value calculated from the atomic distance, the bond angle and the Van der Waals radius.

In the catalyst of this invention it is an indispensable requirement giving great influences on the activity and life of the catalyst that the ratio of the benzene adsorption amount to the metaxylene adsorption amount (benzene/metaxylene) is in the range of from 0.9 to 1.5, preferably from 1.0 to 1.3. As a result of researches we have found that the above ratio has great influence on the life of the catalyst. In case the said ratio of the adsorption amounts is greater than 1.5, side reactions such as cleavage of the benzene ring are caused to occur as well as the intended transalkylation of alkylbenzenes, and further these side reactions poison the catalyst, resulting in an extreme reduction of the catalyst life. In case the said ratio of the adsorption amounts is smaller than 0.9, the activity of the catalyst is low and the catalyst is apt to be degraded by the lapse of time. The reason for this, though not definitely clarified, is presumed to be that the content of the crystalline zeolite structure is very low in such catalyst and it is composed mainly of amorphous materials such as amorphous aluminosilicate.

However, this invention is not restricted by the above described theories.

The transalkylation of alkylbenzenes using the catalyst of this invention is performed under conditions optionally selected from conditions generally adopted in customary transalkylation of alkylbenzene. Fundamentally, by contacting an alkylbenzene with a catalytic amount of the catalyst of this invention at temperatures of 300 to 650° C. under atmospheric or elevated pressures, the transalkylation can be conducted for a long time with high conversion and small ring loss (resulting from cleavage of the aromatic ring). The reaction may be performed in either the liquid or the gaseous phase by employing a fixed bed, a fluidized bed or the like. The reaction conditions however vary depending on the kind of transalkylation. For instance, disproportionation of toluene may be performed in accordance with a fixed bed method, a fluidized bed method or any of other customary methods, but in view of the ease in the operation and the like it is preferred that the reaction be performed in the gaseous phase by employing a fixed bed. The reaction is carried out at temperatures of 300 to 650° C., preferably 380 to 550° C., more preferably 410 to 520° C. Of course the reaction may be allowed to advance at temperatures higher than 650° C., but lowering of the catalyst activity and occurrence of side reactions are frequently observed. This reaction is performed preferably in the presence of hydrogen. The hydrogen present in the reaction system not only reduces the amount of carbon deposited but also contributes to increase of the catalyst activity. No specific restriction is given to the amount of hydrogen added to toluene, and the molar ratio of hydrogen to toluene (hydrogen/toluene) of less than $1/50$ is sufficient. The preferable molar ratio is in the range of from $1/20$ to $1/8$. Since the catalyst of this invention exhibits a high activity for disproportionation, the reaction is allowed to advance under atmospheric pressure, but from the industrial standpoint it is advantageous to carry out the reaction under elevated pressures. The reaction pressure of below 50 atmospheres is preferable, and the optimum pressure is about 30 atmospheres. No specific restriction is given to the reaction time factor $W/F$ g.-cat. hr./mol-toluene (where W denotes the weight of the catalyst and F stands for the number of moles of toluene fed per hour), but in order to obtain high conversion it is preferred that the reaction time factor $W/F$ range from 50 to 400, particularly from 100 to 200.

Any of the substantially pure xylene isomers, a mixture of xylene isomers or hydrocarbon fractions rich in xylene isomers can be isomerized in accordance with the process of this invention. Thus, para-xylene, which is of a growing importance, can be recovered from a $C_8$ catalytic reformate fraction by the low temperature crystallization. The mother liquor produced from such low temperature crystallization is deficient in para-xylene with respect to the thermodynamic equilibrium concentration of xylene isomers, and is an excellent feed for the process of this invention. The process of the isomerization of the invention is carried out at a temperature in the range of from about 200° to 550° C., preferably from 300° to 450° C. In general, a higher conversion is obtained when the temperature is higher, but side reactions are observed when the reaction is performed at higher temperatures.

This reaction is also preferably performed in the presence of hydrogen. The hydrogen-to-hydrocarbon mol ratio is usually in the range of from about 1 to 30, and a hydrogen-to-hydrocarbon mol ratio ranging from 3 to 15 is preferably used.

It is not necessary to employ pure hydrogen, since hydrogen-containing gases, e.g. hydrogen-rich gas from the catalytic reforming of naphthas are suitable. The total pressure is in the range from about 1 to 30 atmospheres and preferably from about 2 to 15 atmospheres.

The isomerization reaction can be conducted over a wide range of the time factor $W/F$, such as a time factor $W/F$ in the range from about 10 to 100.

This invention will be specifically explained hereinbelow by referring to examples, but they are only to illustrate this invention and not to restrict the scope of this invention.

EXAMPLE 1

A zeolite tuff (zeolite content=60 wt. percent) produced in Shimane prefecture was ground to coarse particles having a size of 3 to 0.2 cm. A 3-liter round bottom flask was charged with 1 kg. of the so ground coarse particles and 2 kg. of a 10% ammonium chloride aqueous solution. At temperatures maintained at 70–80° C. only the aqueous solution was circulated at a rate of 30 liters per hour by means of a circulation pump. The treating solution (10% ammonium chloride aqueous solution) was replaced with fresh one every 12 hours. The dealkalization treatment was continued for 48 hours. The dealkalization degree of the zeolite tuff particles was 92 mol percent. Thereafter, the particles were washed with distilled water until no chlorine was detected in the filtrate, and they were dried at 100 to 120° C. Then, the coarse particles were divided and ground to form a powder capable of passing through a 16 mesh sieve, and then the powder was molded into pellets of 5 mm. diameter x 5 mm. The so pelletized zeolite tuff was then calcined at 520° C. in a muffle furnace for 10 hours to form a catalyst of the dealkalized zeolite tuff. The adsorption properties of the so obtained catalyst were measured in accordance with the above described method. The metaxylene adsorption amount was 1.8 weight percent and the ratio of the benzene adsorption amount to the metaxylene adsorption amount was 1.2, both of which were within the ranges specified in this invention.

By employing 22 g. of the so obtained catalyst pellets, disproportionation of toluene was conducted at 450° C. under a pressure of 30 kg./cm.$^2$, at a hydrogen feed rate of 49 N liter/hr. and a toluene feed rate of 20 gr./hr., hence at a time factor ($W/F$) of 100 g.-cat. hr./mol of toluene alone.

The conversion of toluene was 43 mol percent, and yields of benezene, xylenes and trimethylbenzene were 22 mol percent, 18 mol percent and 3 mol percent, respectively. The liquid recovery ratio was 99.1 weight percent.

Disproportionation of toluene was conducted under the same conditions by employing a conventional silica alumina commercially available. The conversion of toluene was 3.6 mol percent. Thus, it is seen that the catalyst of this invention has a catalytic activity far more excellent than that of the conventional silica alumina commercially available.

EXAMPLE 2

Zeolite tuffs A'–H' produced in locales indicated in Table I were ground to coarse particles having a diameter of 2–0.4 cm. and dealkalized with treating aqueous solutions indicated in Table I at 70–75° C. for the indicated period of time, the obtain dealkanized, ammonium-substituted zeolite tuffs having dealkanization degrees also indicated in Table I.

Each of the so obtained dealkanized zeolite tuffs was sufficiently washed with water until no chlorine was detected in the filtrate, dried at 120° C. for 12 hours, divided and ground into powder capable of passing through a 12 mesh sieve, moulded to pellets of 5 mm. diameter x 5 mm. by means of a tablet machine and calcined at 520° for 5 hours. Thus, there were obtained catalysts A–H. With respect to each of these catalysts the metaxylene and benzene adsorption amounts weer measured in accordance with the above described method.

By employing each of the so obtained catalysts A–H respectively, disproportionation of toluene was conducted under 30 kg./cm.$^2$ at a toluene feed rate of 23.5 g./hr. and a hydrogen feed rate of 60 N liter/hr. The reaction temperature (° C.) and the time factor $W/F$ (g.-cat. hr./mol) were varied according to the catalyst activity as indicated in Table II. The results and the adsorption properties of each catalyst are shown in Table II.

The value of the ring loss was calculated by determining the amount of lower hydrocarbons contained in the purge gas by the gas chromatography and dividing the weight of carbon of the lower hydrocarbons by the weight of carbon of the toluene fed.

The value of the relative ring loss was determined as follows. The standard catalyst E which had been obtained by treating a zeolite tuff produced in Fukushima prefecture with hydrochloric acid, dried and calcined and in which the metaxylene adsorption amount was 2.5 weight percent and the ratio of the benzene adsorption amount to the metaxylene adsorption amount was 2.1 exhibited the ring loss value of 1.6 weight percent when disproportionation of toluene was conducted at 510° C. under 30 kg./cm.$^2$ and at $W/F$ of 100 g.-cat. hr./mol by employing the said catalyst until the conversion of toluene to benzene and xylene reached 40 mol percent. The ring loss value of each catalyst system when the conversion of toluene to benzene and xylenes reached 40 mol percent was measured. The relative ring loss value of each catalyst was calculated relatively to the ring loss value of 1.6 of the standard catalyst E which was expressed as 100.

TABLE I

| Zeolite tuff | Locale | Zeolite content (wt. percent) | Treating aqueous solution | Treating time (day) | Dealkalization degree (mol percent) |
|---|---|---|---|---|---|
| A' | Fukushima Prefecture | 60 | 10% ammonium chloride | 3 | 90 |
| B' | Miyagi Prefecture | 65 | 5% ammonium chloride | 2 | 95 |
| C' | do | 65 | 3 N hydrochloric acid | 2 | 85 |
| D' | Fukushima Prefecture | 55 | Non treated | | 0 |
| E' | do | 55 | 4 N hydrochloric acid | 4 | 90 |
| F' | Yamagata Prefecture | 50 | 30% ammonium chloride | 3 | 90 |
| G' | Hokkaido Prefecture | 50 | 5% ammonium chloride | 3 | 90 |
| H' | Fukushima Prefecture | 60 | 10% ammonium chloride | ½ | 40 |

TABLE II

| Catalyst | Adsorption properties | | Reaction conditions | | Conversion of toluene to benzene and xylenes (mol percent) | | | Relative ring loss |
|---|---|---|---|---|---|---|---|---|
| | Metaxylene adsorption amount (wt. percent) | Benzene adsorption amount/ metaxylene adsorption amount | Temp. (° C.) | W/F (g.-cat. hr./mol) | 2 hrs. | 10 hrs. | 100 hrs. | |
| A | 1.8 | 1.1 | 430 | 100 | 40 | 42 | 42 | 43 |
| B | 1.7 | 1.1 | 410 | 200 | 45 | 45 | 45 | 48 |
| C | 2.0 | 1.4 | 460 | 100 | 41 | 40 | 40 | 65 |
| D | 1.2 | 1.1 | 410 | 100 | 0 | | | |
| E | 2.5 | 2.1 | 510 | 100 | 40 | 36 | 29 | 100 |
| F | 0.9 | 1.1 | 460 | 100 | 25 | 20 | | |
| G | 0.9 | 1.1 | 460 | 100 | 25 | 20 | | |
| H | 1.5 | 1.1 | 430 | 100 | 20 | 14 | | |

From Table II above it is evident that the catalysts A, B and C in which the metaxylene adsorption amount and the ratio of the benzene adsorption amount to the metaxylene adsorption amount were within the ranges specified in this invention and which had a dealkalization degree of more than 50 mol percent, could exhibit high catalytic activity and maintain it for a long time. Further, it is evident that these catalysts A, B and C could exhibit very low relative ring loss in spite of their high catalytic activity.

For comparison's sake, the metaxylene adsorption amount and the ratio of the benzene adsorption amount to the metaxylene adsorption amount were measured with respect to a synthetic zeolite, Molecular Sieve 5A (dealkalization degree=70 mol percent). By employing this synthetic zeolite, disproportionation of toluene was carried out under the conditions indicated in Table III. The results and the adsorption properties are shown in Table III.

TABLE III

| Catalyst | Adsorption properties | | Reaction conditions | | Conversion of toluene to benzene and xylenes (mol percent) | | | Relative ring loss |
| --- | --- | --- | --- | --- | --- | --- | --- | --- |
| | Metaxylene adsorption amount (wt. percent) | Benzene adsorption amount/ metaxylene adsorption amount | Temp. (° C.) | W/F (g.-cat. hr./mol) | 2 hrs. | 10 hrs. | 100 hrs. | |
| Molecular sieve 5A | 0.4 | 1.0 | 430 | 100 | 3 | 1 | | |

From Table III above it is evident that Molecular Sieve 5A of synthetic zeolite does not have the adsorption properties specified in this invention and cannot be efficiently used as a catalyst for the transalkylation of alkylbenzenes.

EXAMPLE 3

Zeolite tuffs I'–L' produced in locales indicated in Table IV were ground to coarse particles of a 2–0.4 cm. diameter and dealkalized with treating aqueous solutions indicated in Table IV at 70–75° C. for the indicated period of time to form dealkalized zeolite tuffs substituted with hydrogen or ammonium (whose degrees of dealkalization are also shown in Table IV). The so dealkalized zeolite tuffs were washed sufficiently, dried at 120–150° C. for 15 hours, ground into powder capable of passing through a 12 mesh sieve, pelletized, and calcined at 500° C. for 15 hours to form catalysts I–L. With respect to each of the so obtained catalysts, the metaxylene and benzene adsorption amounts were measured in accordance with the above described method.

By employing 10.4 g. each of the so obtained catalysts I–L respectively, isomerization of metaxylene to orthoxylene and paraxylene was carried out at a metaxylene feed rate of 22.0 g./hr. and a hydrogen feed rate of 93 N liter/ hr. (namely, at a hydrogen-to-metaxylene mol ratio of 2.0) and at a time factor $W/F$ of 50 g.-cat. hr./mol. The other reaction conditions, yields of orthoxylene and paraxylene, and adsorption properties of each catalyst are shown in Table V. In Table V the yield of orthoxylene and paraxylene is expressed in terms of the ratio of the amount actually yielded of orthoxylene and paraxylene to the theoretical equilibrium yield calculated from the thermodynamical composition of xylene (for example the mol ratio of orthoxylene and paraxylene at 300° C. being 45 mol perment).

tremely low and the latter catalyst could not maintain its initial catalytic activity.

What we claim is:

1. A catalyst for use in transalkylation of alkylbenzenes, which consists essentially of a dealkalized zeolite tuff in which the metaxylene adsorption amount is at least 1.0 weight percent and the ratio of the benzene adsorption amount to the metaxylene adsorption amount is in the range of from 0.9 to 1.5, said catalyst being obtained by subjecting a zeolite tuff having a zeolite content of at least 40 weight percent to a dealkalization treatment until more than 50 mol percent of the total alkali metals contained in the zeolite tuff is replaced by $NH_4^+$ or hydrogen ion washing the dealkalized zeolite tuff, drying it and then calcining it.

2. The catalyst of claim 1 wherein the metaxylene adsorption amount is at least 1.2 weight percent and the ratio of the benzene adsorption amount to the metaxylene adsorption amount is in the range of from 1.0 to 1.3.

3. The catalyst of claim 1, wherein the zeolite tuff is molded into pellets having a diameter of 2 to 8 mm. after it has been dealkalized, washed with water and dried.

4. The catalyst of claim 1, wherein the dealkalization treatment comprises treating the zeolite tuff with a dilute aqueous solution of an acid selected from organic and inorganic acids to substitute the alkali components directly with hydrogen.

5. The catalyst of claim 1, wherein the dealkalization treatment comprises treating the zeolite tuff primarily with an aqueous solution of an ammonium compound to substitute the alkali component with $NH_4^+$, then subjecting the so treated zeolite tuff to a heat treatmen a 400 to 650° C. and thereby deammoniating it to form a hydrogen-substituted product.

6. The catalyst of claim 1, wherein the zeolite tuff to

TABLE IV

| Zeolite tuff | Locale | Zeolite content (wt. percent) | Treating aqueous solution | Treating time (day) | Dealkalization degree (mol percent) |
| --- | --- | --- | --- | --- | --- |
| I' | Fukushima Prefecture | 60 | 10% ammonium chloride | 2 | 94 |
| J' | Miyagi Prefecture | 65 | 5% ammonium chloride | 3 | 94 |
| K' | Tochigi Prefecture | 60 | 15% ammonium chloride | 4 | 96 |
| L' | Fukushima Prefecture | 60 | 6 N hydrochloric acid | 6 | 100 |

TABLE V

| Catalyst | Adsorption properties | | Reaction conditions | | Yield of orthoxylene and paraxylene | | |
| --- | --- | --- | --- | --- | --- | --- | --- |
| | Metaxylene adsorption amount (wt. percent) | Benzene adsorption amount/ metaxylene adsorption amount | Temp. (° C.) | Pressure (kg./cm.³) | 2 hours | 10 hours | 100 hours |
| I | 1.9 | 1.2 | 400 | 1 | 69 | 64 | 60 |
| J | 1.7 | 1.1 | 250 | 5 | 68 | 63 | 58 |
| K | 0.9 | 0.8 | 400 | 1 | 27 | 18 | |
| L | 1.5 | 2.3 | 250 | 5 | 67 | 40 | 29 |

From Table V it is evident that the catalysts I and J in which the metaxylene adsorption amount and the ratio of the benzene adsorption amount to the metaxylene adsorption amount were within the ranges specified in this invention could exhibit high catalytic activity and maintain it for a long time. On the other hand, the catalysts K and L whose adsorption properties did not fall within the range specified in this invention were inferior as catalysts, because catalytic activity of the former was exbe dealkalized is in form of coarse particles having a diameter of 0.2 to 5 cm.

7. The catalyst of claim 1, wherein the dealkalization treatment is performed until more that 90 mol percent of the alkali metals contained in the zeolite tuff is dealkalized.

8. A catalyst in use for transalkylation of alkylbenzenes which consists essentially of a dealkalized zeolite tuff in which the metaxylene adsorption amount is at least 1.0 weight percent and the ratio of the benzene adsorption amount to the metaxylene adsorption amount is in the range of from 0.9 to 1.5, said catalyst being obtained by subjecting a zeolite tuff having a zeolite content of at least 40 weight percent to a dealkalization treatment with a dilute aqueous solution of an acid selected from organic and inorganic acids until more than 50 mol percent of the total alkali metals contained in the zeolite tuff is substituted with hydrogen, pelleting or tableting the resulting dealkalized zeolite tuff into small masses without pelleting aids, and calcining it.

9. A catalyst in use for transalkylation of alkylbenezes which consists essentially of a dealkalized zeolite tuff in which the metaxylene adsorption amount is at least 1.0 weight percent and the ratio of the benzene adsorption amount to the metaxylene adsorption amount is in the range of from 0.9 to 1.5, said catalyst being obtained by treating a zeolite tuff having a zeolite content of at least 40 weight percent with aqueous solution of an ammonium compound to substitute the alkali components with $NH_4^+$, pelleting or tableting the resulting dealkalized zeolite tuff into small masses without pelleting aids, and calcining it.

10. In a process for the preparation of benzene and dialkylbenzenes by disproportionation of a monoalkylbenzene by contacting the monoalkylbenzene with a catalytic amount of a catalyst, the improvement wherein said catalyst consists essentially of a dealkalized zeolite tuff in which the metaxylene adsorption amount is at least 1.0 weight percent and the ratio of the benzene adsorption amount to the metaxylene adsorption amount is in the range of from 0.9 to 1.5, said catalyst being obtained by subjecting a zeolite tuff having a zeolite content of at least 40 weight percent to a dealkalization treatment until more than 50 mol percent of the total alkali metals contained in the zeolite tuff is replaced by $NH_4^+$ or hydrogen ion, washing the dealkalized tuff, drying it and calcining it.

11. In a process for the preparation of orthoxylene and paraxylene by isomerization of metaxylene by contacting metaxylene with a catalytic amount of a catalyst, the improvement wherein said catalyst consists essentially of a dealkalized zeolite tuff in which the metaxylene adsorption amount is at least 1.0 weight percent and the ratio of the benzene adsorption amount to the metaxylene adsorption amount is in the range of from 0.9 to 1.5, said catalyst being obtained by subjecting a zeolite tuff having a zeolite content of at least 40 weight percent to a dealkalization treatment until more than 50 mol percent of the total alkali metals contained in the zeolite tuff is replaced by $NH_4^+$ or hydrogen ion, washing the dealkalized zeolite tuff, drying it and calcining it.

References Cited

UNITED STATES PATENTS

| 3,250,728 | 5/1966 | Miale et al. | 252—455 |
| 5,367,884 | 2/1968 | Reid | 252—455 |

DELBERT E. GANTZ, Primary Examiner

G. E. SCHMITKONS, Assistant Examiner

U.S. Cl. X.R.

252—455